Patented Oct. 15, 1935

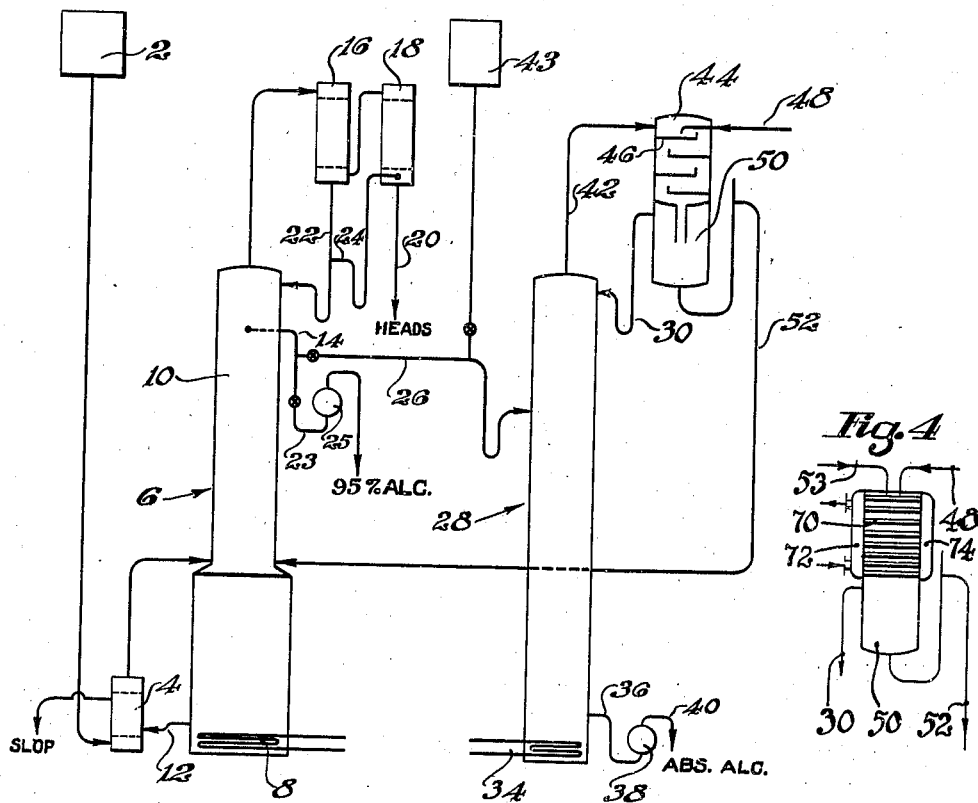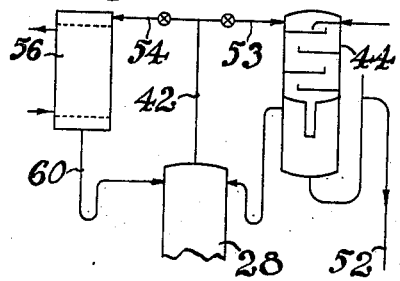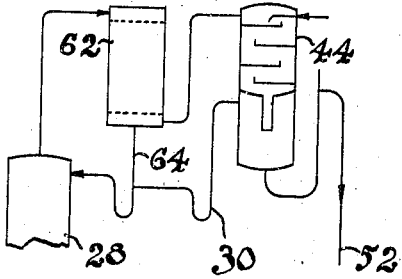

2,017,067

UNITED STATES PATENT OFFICE 2,017,067

PROCESS AND APPARATUS FOR DEHYDRATING LIQUIDS

Wheaton W. Kraft, East Orange, N. J., assignor to The Lummus Company, New York, N. Y., a corporation of Delaware Application April 29, 1933, Serial No. 668,611

20 Claims. (Cl. 202—42)

The present invention relates to processes and apparatus for dehydrating alcohol or other material which cannot be concentrated beyond a certain point by ordinary distillation.

The usual method of dehydrating by utilizing azeotropic mixtures is to distill in the presence of a dehydrating agent which is soluble in the material to be concentrated but insoluble in the water. In the manufacture of absolute ethyl alcohol, for example, alcohol of approximately 95% concentration is distilled in the presence of a material such as benzol which is miscible with alcohol but immiscible with water. As the distillation proceeds, the water is distilled over with the benzol and absolute alcohol remains as residue. Practically all of the difficulties of the process are involved in the handling of the distillate. Inasmuch as some alcohol is necessarily distilled, the distillate contains not only benzol and water but also a considerable amount of alcohol. The distillate, upon condensation, separates into two immiscible layers, the lighter or "benzol" layer containing approximately 85% and the lower or "water" layer approximately 15% of the whole. The two layers consist of ternary mixtures of different proportions of benzol, alcohol and water. These mixtures must be separated from each other and individually treated to recover the benzol and to redistill the alcohol.

According to the present invention, the recovery of the distillate as two separate ternary mixtures is avoided. This is accomplished by introducing into the distillate vapors a considerable quantity of water sufficient to form a dilute solution with which the dehydrating agent is practically immiscible. For example, benzol is miscible with concentrated alcohol in substantially all proportions and is almost entirely immiscible with water. In intermediate alcohol solutions, the benzol is partially soluble to an extent depending on the concentration of alcohol, and in an alcohol solution of less than 20% concentration, the solubility of benzol is negligible. According to this invention, the distillate vapors of the ternary mixture are condensed by washing with a sufficient quantity of water so that the alcohol and water form a dilute alcohol solution of less than the critical 20% concentration. The benzol separates into an upper layer and the dilute alcohol solution separates into a lower layer. The layers may be decanted, the benzol recycled directly for further use in the process, and the dilute alcohol solution returned to the concentrating column for mixture with the original feed.

Additional features of the invention relate to methods for diminishing the quantity of dilute alcohol required to be returned to the concentrating column.

In the accompanying drawing, Fig. 1 is a diagram of one form of apparatus for practicing the present invention; and Figs. 2, 3, and 4 are diagrams of modified forms of apparatus.

The apparatus shown in Fig. 1 comprises a feed tank 2 containing a crude alcohol solution of 7 to 10% concentration obtained by any suitable process of fermentation. Crude alcohol is fed from the tank through a heat exchanger 4 into a mediate point of a distilling and rectifying column 6. The column 6 may be of conventional construction for the manufacture of commercial or 95% alcohol. The column is provided at the bottom with a heating coil 8 and the upper section 10 is provided with contact decks of any suitable form for rectification. As in any commercial process, the slop is withdrawn near the bottom of the column at 12 and is passed through the heat exchanger 4 for heating of the original crude alcohol. Alcohol of approximately 95% concentration is withdrawn from the point 14 below the top of the column. The heads are condensed in condensers 16 and 18, a portion thereof being withdrawn at 20 and the remainder being returned to the column as reflux through the pipes 22 and 24.

The pipe 14 connects with a pipe 23 leading to a cooler 25 from which 95% alcohol may be withdrawn as a product. Another pipe 26 leads to a dehydrating column 28, in which the 95% alcohol is concentrated to absolute alcohol.

The pipe 26 connects with a mediate point of the dehydrating column 28 which is provided throughout its height with any suitable form of contact decks. A heating coil 34 is provided at the bottom of the column. Absolute alcohol is withdrawn at the draw-off 36 near the bottom and is passed through the cooler 38 to the product line 40. Reflux of substantially pure benzol is admitted into the top of the column through a pipe 30 and is continuously recycled in the process. A small quantity of benzol may be continuously introduced into the 95% alcohol fed from a tank 43 to compensate for any unavoidable loss in the process.

In the column ascending vapors of steam and alcohol contact with descending benzol reflux. Benzol, alcohol and water form a ternary mixture of minimum constant boiling point (64.9° C.), which is lower than the boiling point of any of the individual components or of any other combination thereof. As a result, all of the benzol and water and some alcohol are passed as a vapor mixture out of the column through the vapor pipe 42, leaving a residue of absolute alcohol to be withdrawn at the draw-off 36.

The vapor mixture is introduced into a scrubber or washer 44 having contact decks 46. Water is introduced into the scrubber through a pipe 48. The water, in contacting with the vapors, condenses the vapors and forms a condensate of benzol, alcohol and water. The quantity of water related to the quantity of alcohol in the vapors is such that the concentration of the alcohol solution is less than the critical concentration, in which the solubility of the benzol is negligible. In this example, the amount of water necessary for condensation is such that the alcohol solution is of only about 3.5% concentration, which is far below the 20% value for these materials. The condensate passes from the scrubber downwardly into a separating chamber or decanter 50, wherein it separates in two layers, namely, an upper layer of substantially pure benzol and a lower layer of a dilute alcohol solution. The benzol is continuously drawn off and returned to the column as reflux through the pipe 30 which connects with the upper part of the separating chamber 50. The dilute alcohol solution is withdrawn from the bottom of the chamber 50 and passed by the pipe 52 into the column 6 wherein it mixes with the original crude feed for redistillation.

It will be observed that by the introduction of a considerable quantity of water into the condensate, the bothersome ternary mixtures are avoided and that the materials are recovered in such form as to permit their immediate return to the process without any intermediate purifying or concentrating steps. The benzol is directly returned to the dehydrating column, in which it is continuously recycled and the dilute alcohol solution is returned to the concentrating and rectifying column for redistillation to alcohol of commercial concentration.

The arrangement shown in Fig. 2 is in some respects preferable, since it relieves a part of the burden of distilling the dilute alcohol in the primary column 6. In this arrangement, the column 28 and the scrubber 44 are exactly as described above. The vapor pipe 42, however, is branched into two valved pipes 53 and 54, one of which runs to the scrubber 44 and the other to a surface condenser 56 which is cooled in any suitable manner. The entire condensate from the condenser 56 is refluxed to the top of the column 28 by a pipe 60. This reflux is in the proportions of the ternary mixture of alcohol, benzol and water.

The reason for the auxiliary reflux 60 is that a considerable volume of reflux liquid is necessary, particularly in the lower part of the column, where the separation of benzol and anhydrous alcohol takes place. The necessary volume of reflux may, if desired, be made up entirely of benzol introduced by the pipe 30, as shown in Fig. 1, but in that case, since the quantity of reflux required for fractionation is much greater than the quantity of benzol needed for forming the ternary mixture, an excessive volume of benzol must be handled, and a proportionately large volume of dilute alcohol must be run into the primary column 6. But in the arrangement of Fig. 2, a quantity of material continuously circulated between the column and the condenser performs the primary function of providing reflux, and the amount of benzol need be only sufficient to make the ternary mixture. As a consequence, the amount of dilute alcohol condensed in the scrubber is greatly reduced, and a large part of the burden on the primary column 6 is relieved. The actual reactions in the column 28 are substantially identical, whether or not the auxiliary condenser is used.

In Fig. 3, the auxiliary condenser 62 and the scrubber 44 are in series, instead of being in parallel. The condenser 62 is cooled only sufficiently to condense a part of the vapors, the remainder being condensed by contact with water in the scrubber 44. Condensate from the condenser is passed as reflux through a pipe 64 which joins the benzol reflux pipe 30. The system operates similarly to that shown in Fig. 2.

It will be understood that there is a limit to the reduction of dilute alcohol solution obtained by the arrangements of Figs. 2 and 3. This follows from the fact that the amount of water and alcohol vapors introduced into the scrubber 44 and ultimately removed from the system must bear a definite relation to the amount of absolute alcohol withdrawn from the bottom of the column. It has been found that at ordinary cooling water temperatures, the amount of water necessary for condensation of the vapors in the scrubber is greater than that necessary for dilution of the alcohol solution below the critical value. To diminish further the amount of dilute alcohol solution that needs to be handled, a scrubber of the type shown in Fig. 4 may be substituted for the open deck scrubber 44 shown in the preceding diagrams. This scrubber comprises a condenser of the drip type employing a bundle of tubes 70 through which cooling water is circulated from the headers 72 and 74. The vapors of the ternary mixture enter at 53 and the water for scrubbing is introduced at 48, as in the arrangements previously described. The water and vapors descend over the tubes which, being spaced closely together, afford intimate scrubbing contact between the fluids. At the same time, the mixture is cooled by the water circulated through the tubes. The condensate collects in the decantation chamber 50, from which benzol is withdrawn at 30 and dilute alcohol solution at 52. The amount of water introduced at 48 is materially reduced in view of the cooling effect of the tubes 70. As a consequence, the dilute alcohol solution returned to the primary column 6 may be of a concentration as high as 15 or 20%, comprising only a small fraction of the volume of material necessary for redistillation in the process of Fig. 1. As previously stated, the benzol is substantially immiscible in alcohol solutions of such concentrations.

The process is equally adapted to the dehydration of other materials which form azeotropic mixtures with water. Assuming a mixture of a first material with water, it is necessary to employ as a dehydrating agent a third material which is miscible with the first material but immiscible with water and which is also substantially immiscible with dilute aqueous solutions of the first material. The original mixture is heated and distilled in the presence of the third material to leave a concentrate of the first material, and to form a ternary azeotropic distillate which is condensed in the presence of a large body of water. The condensation in the presence of a considerable quantity of water forms a dilute solution of the first material in which the dehydrating agent is practically insoluble.

Having thus described the invention, what is claimed is:

1. The process of dehydrating a first liquid material which is miscible with water and forms a constant boiling mixture therewith, which consists in distilling said material and water in the presence of a third material miscible with the first material but immiscible with water and capable of forming a ternary azeotropic mixture with the first material and water, withdrawing the first material as concentrate, condensing the distillate vapors of the three materials in the presence of a sufficient body of water to form a dilute solution of the first material with which the third material is substantially immiscible, separating the condensate layers, and distilling the condensed dilute solution.

2. The process of dehydrating alcohol which consists in distilling a concentrated aqueous alcohol solution in the presence of a dehydrating agent miscible with alcohol but immiscible with water, withdrawing absolute alcohol, condensing the distillate vapors in the presence of a body of water sufficient to form a dilute alcohol solution in which the dehydrating agent is substantially insoluble, separating the condensate layers, returning the dehydrating agent for further distillation with aqueous alcohol, and concentrating the dilute alcohol condensate.

3. The process of dehydrating commercial alcohol which consists in distilling the alcohol in the presence of benzol to leave a residue of absolute alcohol, condensing the vapors of alcohol, benzol and water in the presence of a quantity of water sufficient to form a dilute alcohol solution with which benzol is substantially immiscible, separating benzol condensate and returning it to the distillation process, and redistilling the dilute alcohol solution.

4. The process of dehydrating commercial alcohol which consists in distilling the alcohol in the presence of benzol to leave a residue of absolute alcohol, condensing the evolved vapors of alcohol, benzol and water in the presence of a quantity of water sufficient to form a dilute alcohol solution of concentration less than 20% with which benzol is substantially immiscible, separating benzol condensate and returning it to the distillation process, and redistilling the dilute alcohol solution.

5. The process of dehydrating a first liquid material which is miscible with water and forms a constant boiling mixture therewith, which consists in distilling a concentrated solution of said material and water in the presence of a third material miscible with the first material but immiscible with water and capable of forming a ternary azeotropic mixture with the first material and water, withdrawing the first material as concentrate, condensing a part of the distillate vapors and returning the condensate as reflux, condensing the remainder of the distillate vapors of the three materials in the presence of a sufficient body of water to form a dilute solution of the first material with which the third material is substantially immiscible, separating the final condensate layers, and distilling the condensed dilute solution.

6. The process of dehydrating alcohol which consists in distilling a concentrated aqueous alcohol solution in the presence of a dehydrating agent miscible with alcohol but immiscible with water, withdrawing absolute alcohol as residue, condensing a part of the distillate vapors and returning the condensate as reflux, condensing the remainder of the distillate vapors in the presence of a body of water sufficient to form a dilute alcohol solution in which the dehydrating agent is substantially insoluble, separating the final condensate layers, returning the dehydrating agent for further distillation with aqueous alcohol, and concentrating the dilute alcohol condensate.

7. The process of dehydrating commercial alcohol which consists in distilling the alcohol in the presence of benzol to leave a residue of absolute alcohol, condensing a part of the vapors of alcohol, benzol and water and returning condensate as reflux, condensing the remainder of the vapors in the presence of a quantity of water sufficient to form a dilute alcohol solution with which benzol is substantially immiscible, separating benzol condensate and returning it to the distillation process, and redistilling the dilute alcohol solution.

8. The process of dehydrating commercial alcohol which consists in distilling the alcohol in the presence of benzol to leave a residue of absolute alcohol, condensing a part of the vapors of alcohol, benzol and water and returning condensate as reflux, condensing the remainder of the vapors in the presence of a quantity of water sufficient to form a dilute alcohol solution of concentration less than 20% with which benzol is substantially immiscible, separating benzol condensate and returning it to the distillation process, and redistilling the dilute alcohol solution.

9. The process of dehydrating alcohol which consists in distilling concentrated aqueous alcohol in the presence of a dehydrating agent which is miscible with alcohol but immiscible with water to form a ternary azeotropic vapor mixture, withdrawing absolute alcohol as residue, dividing the evolved vapors, condensing one part of the divided vapors and returning condensate as reflux, condensing the other part of the vapors in the presence of a body of water sufficient to form a dilute alcohol solution in which the dehydrating agent is substantially insoluble, separating the condensate layers, returning the dehydrating agent for further distillation with aqueous alcohol, and concentrating the dilute alcohol condensate.

10. The process of dehydrating alcohol which consists in distilling concentrated aqueous alcohol in the presence of a dehydrating agent which is miscible with alcohol but immiscible with water to form a ternary azeotropic vapor mixture, withdrawing absolute alcohol as residue, subjecting the vapors to a partial condensation, returning condensate as reflux, condensing the remainder of the vapors in the presence of a body of water sufficient to form a dilute alcohol solution in which the dehydrating agent is substantially insoluble, separating the final condensate layers, returning the dehydrating agent for further distillation with aqueous alcohol, and concentrating the dilute alcohol condensate.

11. Dehydrating apparatus comprising a dehydrating column, means for feeding material to be dehydrated into a mediate part of the column, a draw-off for concentrate adjacent the bottom of the column, a vapor pipe, a scrubber for washing the vapors with water, a decantation chamber, and a pipe for conducting dehydrating agent from the decantation chamber to the column.

12. Dehydrating apparatus comprising a dehydrating column, means for feeding material to be dehydrated into a mediate part of the column, a draw-off for concentrate adjacent the bottom of the column, a vapor pipe, a condenser and a scrubber both connected to the vapor pipe, means for conveying reflux from the condenser to the column, means for introducing water into the scrubber, a decantation chamber, and a connection to convey dehydrating agent from the decantation chamber to the column.

13. Dehydrating apparatus comprising a dehydrating column, means for feeding material to be dehydrated into a mediate part of the column, a draw-off for concentrate adjacent the bottom of the column, a vapor pipe, a partial condenser, a connection for conveying condensate from the partial condenser to the column, a scrubber for condensing the remainder of the vapors, a decantation chamber, and means for conveying dehydrating agent from the decantation chamber to the column.

14. The process of dehydrating a first liquid material which is miscible with water and forms a constant boiling mixture therewith, which consists in distilling said material and water in the presence of a third material miscible with the first material but immiscible with water and capable of forming a ternary azeotropic mixture with the first material and water, withdrawing the first material as concentrate, condensing distillate vapors of the three materials by passing them over cooled surfaces and simultaneously introducing water in mixture therewith to form a dilute condensate of the first material with which the third material is substantially immiscible, and separating the condensate layers.

15. The process of dehydrating commercial alcohol which consists in distilling the alcohol in the presence of benzol to leave a residue of absolute alcohol, condensing the vapors of alcohol, benzol and water by passing them over a cooled surface in the presence of a quantity of water sufficient to form a dilute alcohol solution with which benzol is substantially immiscible, separating benzol condensate, and returning it to the distillation process.

16. The process of dehydrating a first liquid material which is miscible with water and forms a constant boiling mixture therewith, which consists in distilling a concentrated solution of said material and water in the presence of a third material miscible with the first material but immiscible with water and capable of forming a ternary azeotropic mixture with the first material and water, withdrawing the first material as concentrate, condensing a part of the distillate vapors and returning the condensate as reflux, condensing the remainder of the distillate vapors of the three materials by passing them over cooled surfaces while washing with water to form a dilute condensate of the first material with which the third material is substantially immiscible, and separating the final condensate layers.

17. The process of dehydrating alcohol which consists in distilling concentrated aqueous alcohol in the presence of a dehydrating agent which is miscible with alcohol but immiscible with water to form a ternary azeotropic vapor mixture, withdrawing absolute alcohol as residue, dividing the evolved vapors, condensing one part of the divided vapors and returning condensate as reflux, condensing the other part of the vapors by passing them over cooled surfaces while washing with water to form a dilute alcohol condensate in which the dehydrating agent is substantially insoluble, and separating the condensate layers of dehydrating agent and dilute alcohol solution.

18. Dehydrating apparatus comprising a dehydrating column, means for feeding material to be dehydrated into a mediate part of the column, a draw-off for concentrate adjacent the bottom of the column, a vapor pipe, a scrubber for washing the vapors with water, means for introducing water into the scrubber to contact with the vapors, said scrubber including cooled tubes over which the vapors and water flow, a decantation chamber, and a pipe for conducting dehydrating agent from the decantation chamber to the column.

19. Dehydrating apparatus comprising a dehydrating column, means for feeding material to be dehydrated into a mediate part of the column, a draw-off for concentrate adjacent the bottom of the column, a vapor pipe, a condenser and a scrubber both connected to the vapor pipe, means for conveying reflux from the condenser to the column, means for introducing water into the scrubber, said scrubber including cooled tubes over which the vapors and water flow, a decantation chamber, and a connection to convey dehydrating agent from the decantation chamber to the column.

20. Dehydrating apparatus comprising a dehydrating column, means for feeding material to be dehydrated into a mediate part of the column, a draw-off for concentrate adjacent the bottom of the column, a vapor pipe, a partial condenser, a connection for conveying condensate from the partial condenser to the column, a scrubber for condensing the remainder of the vapors, means for introducing water into the scrubber for washing the vapors, said scrubber including cooled tubes over which the vapors and water flow, a decantation chamber, and means for conveying dehydrating agent from the decantation chamber to the column.

WHEATON W. KRAFT.